2,847,414
4-ARYLPYRIDINES

Claude J. Schmidle, Moorestown, and Richard C. Mansfield, Haddonfield, N. J., assignors to Rohm & Haas Company, Philadelphia, Pa., a corporation of Delaware No Drawing. Application April 13, 1956
Serial No. 577,943

4 Claims. (Cl. 260—290)

This invention relates to a process for preparing 4-arylpyridines and to the compounds thus prepared.

There is described in United States Patent No. 2,647,117 to Howard D. Hartough et al. a method for preparing basic nitrogenous compounds by reacting together an olefinically unsaturated hydrocarbon, formaldehyde, and ammonia or a primary amine in the presence of hydrochloric acid. This reaction gives cyclic compounds; specifically tetrahydro-1,3-oxazines tend to form. When α-methylstyrene is the hydrocarbon which is reacted with ammonia and formaldehyde under the influence of hydrochloric acid, there is formed 6-methyl-6-phenyltetrahydro-1,3-oxazine. When ammonia is replaced with methylamine, the corresponding N-methyl compound, 3,6-dimethyl-6-phenyltetrahydro-1,3-oxazine is formed.

There is described in our application Serial No. 431,587, filed May 21, 1954, now United States Patent No. 2,750,385, a method for preparing tetrahydropyridines from 6-alkyltetrahydro-1,3-oxazines by heating said 6-alkyltetrahydro-1,3-oxazines in an acidic environment provided by an aqueous strong non-oxidizing mineral acid stronger than phosphoric acid. During this procedure rearrangement and dehydration occur. Thus, when 6-methyl-6-phenyltetrahydro-1,3-oxazine is the tetrahydro-1,3-oxazine which is heated with an aqueous, strong, non-oxidizing mineral acid, there is formed 4-phenyltetrahydropyridine. When 6-methyl-6-phenyltetrahydro-1,3-oxazine is replaced with 3,6-dimethyl-6-phenyltetrahydro-1,3-oxazine, there is formed 1-methyl-4-phenyltetrahydropyridine. Other 6-methyl-6-aryltetrahydro-1,3-oxazines react similarly to give corresponding 4-aryl-1,2,3,6-tetrahydropyridines. The dehydrogenation of 4-arylpiperidines or partially reduced 4-arylpyridines to 4-arylpyridines has not been previously reported or suggested. While Morton "The Chemistry of Heterocyclic Compounds" (1946), pp. 190–191, and Wulff et al., U. S. Patent 2,019,883 (1935), and Groll et al., U. S. Patent 2,184,235 (1939), and Roberts et al., U. S. Patent 2,300,971 (1942) disclose the process of dehydrogenation in general and dehydrogenation of piperidine, $C_5H_{11}N$, and partially reduced pyridines, they make no mention of the dehydrogenation of 4-arylpiperidines or partially reduced 4-arylpyridines. In fact, Adkins et al., J. Am. Chem. Soc., 71, 2964 (1949), reported that 4-phenylpiperidine could not be dehydrogenated to 4-phenylpyridine, while piperidine and alkylpiperidines such as α-, β-, and γ-pipecoline and lupetidine were readily dehydrogenated to the corresponding pyridines in yields of 45–64%. Further evidence of the anomolous behavior of 4-aryl six-membered nitrogen heterocyclic compounds is given by Overhoff et al., Rec. trav. chim., 50, 957 (1931), who show that while 2-phenylpyridine and 3-phenylpyridine can be reduced to the corresponding piperidines, 4-phenylpyridine cannot be reduced using the same conditions.

We have found, in contrast to the teachings of the art, that 4-aryltetrahydropyridines of the formula

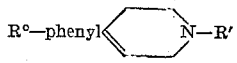

wherein R° is hydrogen, alkyl, aralkyl, or aryl and R' is hydrogen or a lower alkyl group, best of not over four carbon atoms, particularly methyl, can be dehydrogenated to the corresponding 4-arylpyridines. The dehydrogenation is accomplished in liquid phase on a dehydrogenation catalyst such as palladium on a carrier such as alumina at temperatures of about 170° to 220° C. When the dehydrogenation reaction is carried out in the presence of a hydrogen acceptor such as nitrobenzene, the reaction is best effected between about 125° and 170° C. Thus, between 125° and 220° C., 4-arylpyridines can be prepared by heating in liquid phase a 4-aryltetrahydropyridine in the presence of a palladium catalyst and preferably in the presence of nitrobenzene. This is in sharp contrast with the higher temperatures shown in the above-cited art as used in the case of other materials and in contrast with the noted resistance of 4-arylpiperidines and related substances to undergo dehydrogenation to useful and definite products.

Our process leads to novel compounds of the structure

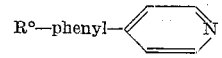

where R° is hydrogen, alkyl, aralkyl, or aryl, the alkyl group preferably having one to four carbon atoms and the aryl group being phenyl. Thus, one can start with 4-phenyltetrahydropyridine and go with ease under the specified conditions to 4-phenylpyridine. From 4-tolyltetrahydropyridine there is obtained 4-tolylpyridine; from 4-p-tert-butylphenyltetrahydropyridine, 4-p-tert-butylphenylpyridine; from 4-benzylphenyltetrahydropyridine, 4-benzylphenylpyridine; from 4-p-phenylphenyltetrahydropyridine, 4-p-phenylphenylpyridine, etc. When the 4-aryltetrahydropyridine contains a substituent on the nitrogen atom, this substituent is split off during dehydrogenation. Thus, 1-methyl-4-phenyltetrahydropyridine yields 4-phenylpyridine, 1-methyl-4-p-ethylphenyltetrahydropyridine yields 4-p-ethylphenylpyridine, 1-ethyl-4-p-isopropylphenyltetrahydropyridine yields 4-p-isopropylphenylpyridine, 1-methyl-4-xylyltetrahydropyridine yields 4-xylylpyridine, 1-methyl-4-benzylphenyltetrahydropyridine yields 4-benzylphenylpyridine, 1-methyl-4-phenylphenyltetrahydropyridine yields 4-phenylphenylpyridine, 4-p-dodecylphenyltetrahydropyridine gives 4-p-dodecylphenylpyridine, 4-tert-octylphenyltetrahydropyridine gives 4-tert-octylphenylpyridine, 4-dodecylphenyl-1-methyltetrahydropyridine yields 4-dodecylphenylpyridine, and so on. It is of interest that the N-substituent does not wander, but rather is eliminated. It should be also commented that the compounds having alkyl groups from about amyl upwards, such as octyl, decyl, dodecyl, cetyl, or stearyl are of interest in providing hydrophobic groups which are important in surface-active derivatives. Smaller alkyl groups are also of importance as they help supply the hydrophobic-hydrophilic balance in surface-active derivatives wherein a compensating hydrophobic group is introduced in a derivative.

The 4-arylpyridines are characterized by an unusual stability. Thus, they resist hydrogenation, whereas the 2-phenylpyridines can be hydrogenated. Also, there is a difference in reactivity of the pyridine rings in the two types of compounds. Because of the stability of the former structure, the 4-arylpyridines can be converted to the pyridine substituted styrenes which can be used for providing resins with a basic group in a non-hindered structure. This finds use in making fibers, as from acrylonitrile. The pyridine nitrogen in the new compounds is not subject to the hindrances of isomeric compounds. Hence, these new compounds can be quaternized with alkylating agents, such as methyl iodide, bromide, or chloride, benzyl chloride, alkylbenzyl halides, dodecenyl chloride, ethylene oxide, ethyl sulfate, butyl bromide, dodecyl bromide, cetyl bromide, and other alkyl, alkenyl, and aralkyl halides.

When the alkylating group is long-chained or when the phenyl group of the 4-phenylpyridine possesses a higher alkyl group, the quaternary ammonium compounds formed therewith have considerable surface activity and find use in textile finishing and as bactericidal and fungicidal agents.

The pyridine and the pyridinium groups may also be utilized in polymers or copolymers from the vinyl derivatives. If a polyvinylidene compound, such as divinylbenzene or ethylene dimethacrylate is used as a crosslinking agent, anion exchange resins can be prepared. These may be further modified by halomethylation and quaternization of the halomethyl group.

The 4-arylpyridines are further useful as chemical intermediates for making dyes. They may be acetylated, sulfonated, or nitrated. The nitro derivatives can be reduced to amino groups.

Another promising application of the 4-arylpyridines is as catalysts in the formation of foams from isocyanates, these compounds serving as the bases needed to start the reaction. In another application for these compounds as catalysts, they are used in the form of salts. Thus, the hydrochlorides are good catalysts for curing urea-formaledhyde or melamine-formaledhyde condensates as in textiles, papers, coatings, or castings. The salts have good solubility and have an advantage in that they do not cause objectionable odors. Another use of the compounds of this invention is as corrosion inhibitors in strong aqueous acids.

Typical preparations of the compounds of this invention are presented in the following examples which are given by way of illustration and not by way of limitation. Parts are by weight unless otherwise designated.

*Example 1*

A mixture of 88 parts of 4-phenyl-1,2,3,6-tetrahydropyridine, about five parts of 5% palladium on alumina catalyst and 435 parts of nitrobenzene was stirred at 135° C. for six hours in an atmosphere of nitrogen and then cooled. There was added an excess of dilute hydrochloric acid and the mixture was extracted with toluene. The aqueous layer was made basic with excess sodium hydroxide and the amine was taken up in toluene, dried, and distilled to give 69 parts (81%) of 4-phenylpyridine, boiling point 99°–101° C./1.0 mm. This crystallized and after two recrystallizations from heptane melted at 77°–78° C.

Analysis.—Calcd. for $C_{11}H_9N$: C, 85.13; H, 5.84; N, 9.03%. Found: C, 85.20; H, 6.00; N, 8.98%.

The picrate was prepared and melted at 195°–197° C.

Analysis.—Calcd. for $C_{17}H_{12}N_4O_7$: C, 53.13; H, 3.15; N, 14.58%. Found: C, 53.36; H, 3.23; N, 14.36%.

*Example 2*

A mixture of 40 parts of 4-phenyl-1,2,3,6-tetrahydropyridine and five parts of 5% palladium on alumina was stirred and heated at 200° C. in an atmosphere of nitrogen for two hours, cooled, diluted with ethanol, filtered and distilled to give 20 parts (52%) of 4-phenylpyridine, boiling point 95°–105° C./1.5 mm. This crystallized and melted at 68°–71° C.

Analysis.—Calcd. for $C_{11}H_9N$: C, 85.13; H, 5.84; N, 9.03%. Found: C, 84.72; H, 6.43; N, 8.88%.

*Example 3*

A mixture of 96 parts of 1-methyl-4-phenyl-1,2,3,6-tetrahydropyridine, four parts of 5% palladium on alumina and 430 parts of nitrobenzene was stirred at 130°–135° C. for two hours. After the reaction mixture was cooled and filtered, there was slowly added excess dilute hydrochloric acid and the mixture was extracted with toluene. The aqueous phase was made basic with excess aqueous 50% sodium hydroxide solution and the amine which resulted was taken up in toluene, dried, and distilled to give 60 parts (70%) of 4-phenylpyridine, boiling point 90°–100° C./0.9 mm. This crystallized and melted at 74°–76° C. after two recrystallizations from heptane. A mixed melting point with material prepared from 4-phenyl-1,2,3,6-tetrahydropyridine was 75°–77° C.

Analysis.—Calcd. for $C_{11}H_9N$: C, 85.13; H, 5.84; N, 9.03%. Found: C, 85.47; H, 5.91; N, 9.04%.

*Example 4*

A mixture of 170 parts of aqueous 37% formaldehyde solution, 71 parts of methylamine hydrochloride, 65 parts of water, and 118 parts of α-methylstyrene was stirred at 95°–100° C. for four hours and then cooled. There was slowly added 75 parts of concentrated sulfuric acid and the mixture was stirred at 95°–100° C. for another three hours, cooled, diluted with 750 parts of water, extracted with toluene, and made basic with 210 parts of aqueous 50% sodium hydroxide solution. The basic material which separated was taken up in heptane, dried over anhydrous potassium carbonate, and stripped free of heptane by heating under reduced pressure. There were added 243 parts of nitrobenzene and nine parts of 5% palladium on alumina. The mixture was stirred at 140°–160° C. for two hours in an atmosphere of nitrogen while the water of reaction was removed by a water separator. The mixture was cooled, filtered, and distilled to give 57 parts of basic material, coming over at 100°–115° C./0.7 mm. Hg. This was redistilled to give 44 parts of 4-phenylpyridine, distilling at 100°–105° C./1.3 mm. Hg, which solidified and melted at 75°–76° C.

*Example 5*

A mixture of 76 parts of 1-methyl-4-p-tolyl-1,2,3,6-tetrahydropyridine, 5 parts of 5% palladium on alumina catalyst, and 150 parts of nitrobenzene was stirred at 150°–160° C. for six and one-half hours in an atmosphere of nitrogen while the water of reaction was collected in a water removal trap. The mixture was cooled and then diluted with excess dilute hydrochloric acid and toluene. It was filtered free of catalyst and the organic layer was extracted once with dilute hydrochloric acid and once with water. The combined aqueous phases were extracted twice with toluene and then made basic with excess aqueous 50% sodium hydroxide solution. The amine was taken up in toluene, dried, and distilled to give 37 parts of 4-p-tolylpyridine and was recrystallized from heptane to give 30 parts of 4-p-tolylpyridine, melting point 90°–91° C., containing 84.89% carbon, 6.45% hydrogen, and 8.28% of nitrogen. Corresponding theoretical values are 85.17%, 6.55%, and 8.28% respectively.

The picrate thereof melted at 199°–201° C. and contained 54.49% of carbon, 3.87% of hydrogen, and 13.80% of nitrogen. Corresponding theoretical values are 54.27%, 3.54%, and 14.07% respectively.

*Example 6*

A mixture of 37 parts of 1-methyl-4-p-isopropyl-phenyl-tetrahydropyridine, 150 parts of nitrobenezene and four parts of 5% palladium on alumina catalyst was stirred at 140°–150° C. for two and one-half hours in an atmosphere of nitrogen while water of reaction was removed in a water separator. The mixture was cooled and diluted with excess dilute hydrochloric acid and toluene. The catalyst was removed by filtration and the layers separated. The organic layer was washed with dilute hydrochloric acid and then with water. The combined aqueous phases were extracted with a toluene-heptane mixture and then made basic with excess 50% sodium hydroxide solution. The basic material which separated was extracted with toluene, dried over anhydrous potassium carbonate and distilled to give 19 parts of material, boiling point 130°–137° C./0.7 mm. Hg. This solidified and was recrystallized from heptane to 4-p-isopropylphenylpyridine, melting point 70°–72° C. This contained 85.21% of carbon, 7.72% of hydrogen and 7.10% of nitrogen. Corresponding theoretical values are 85.23%, 7.67%, and 7.10% respectively. The picrate melted at 184°–186° C. and contained 56.38% of carbon, 4.37% of hydrogen and 13.02% of nitrogen. Corresponding theoretical values are 56.34%, 4.25% and 13.14% respectively.

*Example 7*

A mixture of 46 parts of 4-p-tolyl-1,2,3,6-tetrahydropyridine, 190 parts of nitrobenzene, and five parts of 5% palladium on alumina catalyst was stirred at 130°–160° C. for two hours in an atmosphere of nitrogen while water of reaction was removed in a water separator. The mixture was cooled, filtered, and distilled to give 39 parts of material, distilling 90°–110° C./0.1 mm. Hg. This solidified and was recrystallized from heptane to give pure 4-p-tolylpyridine, melting point 90–91° C. This contained 85.14% of carbon, 6.53% of hydrogen, and 8.43% of nitrogen. Corresponding theoretical values are 85.17%, 6.55%, and 8.28% respectively. The melting point of a mixture with 4-p-tolylpyridine prepared as in Example 5 was 90°–91° C.

The picrate melted at 199°–201° C. and contained 54.52% of carbon, 3.78% of hydrogen, and 14.15% of nitrogen. Corresponding theoretical values are 54.27%, 3.54%, and 14.07% respectively. The melting point of a mixture with the picrate of 4-tolylpyridine prepared as in Example 5 was 199°–201° C.

*Example 8*

A mixture of 61 parts of 4-p-isopropylphenyl-1,2,3,6-tetrahydropyridine, 250 parts of nitrobenzene and four parts of 5% palladium on alumina catalyst was stirred at 140°–150° C. for two hours in an atmosphere of nitrogen while water of reaction was removed in a water separator. The mixture was cooled, filtered, and distilled to give 45 parts of material, distilling 112°–125° C./0.1 mm. Hg. This solidified and was recrystallized from heptane to 4-isopropylphenylpyridine, melting point 70°–72° C. This contained 84.96% of carbon, 7.82% of hydrogen, and 7.18% of nitrogen. Corresponding theoretical values are 85.23%, 7.67%, and 7.10% respectively. The melting point of a mixture with 4-p-isopropylphenylpyridine prepared as in Example 6 was 70°–72° C.

The picrate melted at 184°–186° C. and contained 56.43% of carbon, 4.22% of hydrogen, and 13.02% of nitrogen. Corresponding theoretical values are 56.34%, 4.25%, and 13.14% respectively. The melting point of a mixture wtih the picrate of 4-p-isopropylphenylpyridine prepared as in Example 6 was 184°–186° C.

In the same way other 4-alkylphenyltetrahydropyridines are dehydrogenated to the desired 4-alkylphenylpyridines, while these alkyl groups may be replaced by benzyl or phenyl groups and the reaction carried out in the same way to the corresponding substituted 4-phenylpyridines.

We claim:

1. A process for preparing 4-arylpyridines which comprises heating at a dehydrogenating temperature between 125° and 220° C. a compound of the structure

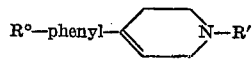

wherein R′ is a member of the class consisting of hydrogen and the lower alkyl groups and R° is a member of the class consisting of hydrogen and alkyl, phenyl, and benzyl groups, with a palladium dehydrogenating catalyst, whereby dehydrogenation of said compound is accomplished in liquid phase so as to form 4-arylpyridine.

2. A process for preparing 4-phenylpyridine which comprises heating at a dehydrogenating temperature between 125° and 220° C. 4-phenyltetrahydropyridine with a palladium dehydrogenating catalyst, whereby dehydrogenation of the 4-phenyltetrahydropyridine is accomplished in liquid phase so as to form 4-phenylpyridine.

3. The process of claim 1 in which the palladium dehydrogenating catalyst is borne on an alumina carrier.

4. The process of claim 2 in which the palladium dehydrogenating catalyst is borne on an alumina carrier.

References Cited in the file of this patent

UNITED STATES PATENTS

| | | |
|---|---|---|
| 2,744,903 | Boettner | May 8, 1956 |
| 2,765,310 | Horrobin | Oct. 2, 1956 |
| 2,765,311 | Horrobin et al. | Oct. 2, 1956 |

OTHER REFERENCES

Lee et al.: Chem. Abst., vol. 41, column 6251 (1947).
Linstead et al.: Chem. Abstracts, vol. 47, columns 3805–6 (1953).